United States Patent [19]
Honeycutt et al.

[11] 3,811,774
[45] May 21, 1974

[54] CONTINUOUS WAVE RADAR FOR RANGE AND VELOCITY MEASUREMENT

[75] Inventors: Thomas E. Honeycutt; William F. Otto; Charles M. Cason, III, all of Huntsville, Ala.

[73] Assignee: The United States of America as represented by the Secretary of the Army, Washington, D.C.

[22] Filed: Apr. 20, 1972

[21] Appl. No.: 245,995

[52] U.S. Cl. .................................... 356/5, 356/28
[51] Int. Cl. ......................... G01c 3/08, G01p 3/36
[58] Field of Search .................. 356/5, 28, 106 LR; 343/112 DE, 8

[56] References Cited
UNITED STATES PATENTS

| | | | |
|---|---|---|---|
| 3,733,129 | 5/1973 | Bridges | 356/5 |
| 3,431,514 | 3/1969 | Oshman et al. | 250/99 |
| 3,487,327 | 12/1969 | Clark | 332/7.51 |
| 3,697,887 | 10/1972 | Lee et al. | 356/106 X |
| 3,649,123 | 3/1972 | Ulicki | 356/5 |
| 3,411,849 | 11/1968 | Aronowitz | 356/28 |
| 3,611,182 | 10/1971 | Treacy | 356/5 |
| 1,639,667 | 8/1927 | Ranger | 343/8 X |
| 3,438,036 | 4/1969 | Bennett | 343/113 DE |
| 3,644,841 | 2/1972 | Smith | 356/106 LR X |

FOREIGN PATENTS OR APPLICATIONS 183,492  3/1970  Great Britain ..................... 356/28

*Primary Examiner*—Richard A. Farley
*Assistant Examiner*—S. C. Buczinski
*Attorney, Agent, or Firm*—Edward J. Kelly; Herbert Berl; Jack W. Voigt

[57] ABSTRACT

A frequency modulated, continuous wave radar range measurement system using a laser oscillator is disclosed. A ring laser, carbon dioxide ($CO_2$), laser oscillator allows target range and velocity measurement as either an active or a passive system. Nonlinear variation of laser output power is obtained by mixing the reflected signal with the energy within the laser cavity. In an active system the resulting beat frequency is sensed by a local receiver-detector and reduced to obtain the range and velocity data at the transmission site. The beat frequency is also superimposed on the transmitted laser beam and is therefore available at the target causing the beat frequency and is available to other detectors which may be positioned to receive a portion of the reflected energy, affording a passive system.

8 Claims, 3 Drawing Figures

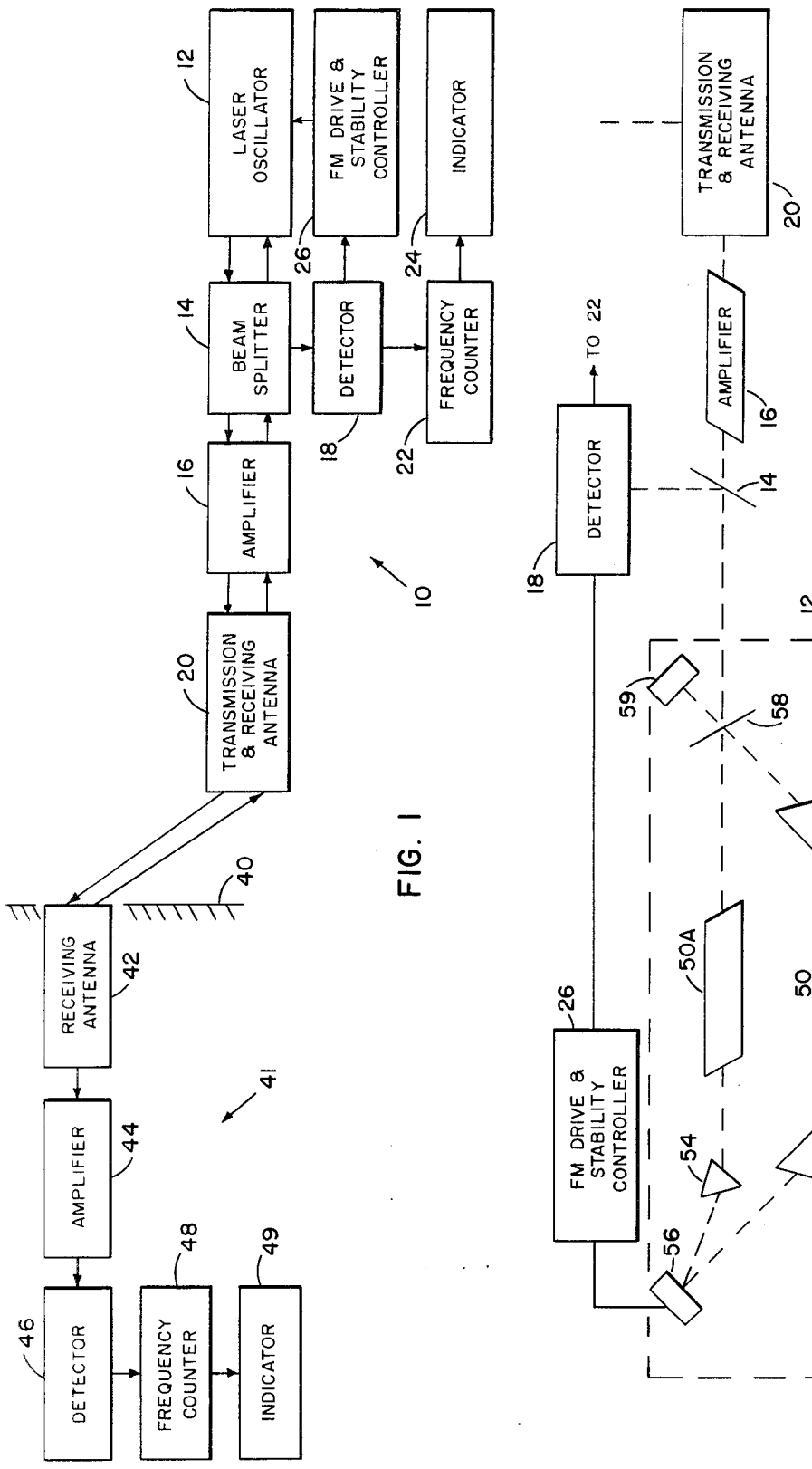

CONTINUOUS WAVE RADAR FOR RANGE AND VELOCITY MEASUREMENT

BACKGROUND OF THE INVENTION

Simple continuous wave (CW) radar is unable to measure range, partially because of the relatively narrow bandwidth of its transmitted wave. Conventional methods used to circumvent this problem and to obtain information related to range and velocity include a complex frequency modulated (FM) CW radar approach. In the FM-CW radar the transmitter frequency is increased or decreased as a function of time and reflected energy from the target can be heterodyned or homodyned with a portion of the transmitted signal to obtain target range and velocity. Fixed measurement errors in the system accuracy include such errors as transmitter leakage and the inherent limiting accuracy of frequency measuring devices. For example, a relatively accurate cycle-counting frequency meter measures beat cycles during the modulation period of transmission and has an error that is a function of the frequency excursion. A large frequency excursion is required to provide a small fixed error, which results in an unwanted, relatively broad bandwidth. Additional errors can be introduced into the CW radar from other sources when uncontrolled variation exists in the transmitter frequency or in the frequency excursion. Unwanted signals, which introduce error, include multiple path reflections from unwanted targets and leakage of transmitted energy into the receiver through antenna coupling. Additional detailed disclosures of prior art procedures and methods necessary for FM-CW radar measurement is found in "Introduction to Radar Systems" by M. I. Skolnik, pages 86–103, published by McGraw-Hill Book Company, Inc., 1962.

The detector for return signals in standard radar systems is protected by separating the functions of transmitting and receiving, transmitting the primary beam with one antenna and receiving the reflected signal with a separate antenna. In single antenna systems, structures are provided to short-circuit the receiver line from the antenna during transmission of the power beam. Microseconds later, the power beam is turned off and its communicating line short-circuited. The receiver line is then opened to receive the reflected signal. This process requires the use of regular bursts of transmitted power. It is also common to carefully shield and protect the sensitive detector circuits from the power amplifier and signal generator circuits.

Conventional radar systems, used in a passive configuration, require a synchronous source, which is usually obtained from a reference frequency riding within the transmitted beam. Use of the reference beam and the main radar beam enables a remote observer having a receiving antenna and electronic circuit to determine range and velocity with respect to the transmitting location.

SUMMARY OF THE INVENTION

In a continuous wave optical radar system, range and velocity information is obtained when the reflected energy from a target is mixed with the energy within a laser oscillator. The laser oscillator and the associated amplifier circuit provide both transmitting and receiving circuitry for the optical signal. The CW laser radar, or lidar, transmits an extremely narrow bandwidth wave which is frequency modulated by minutely varying the length of the laser cavity with a mirror mounted on a servo-controlled piezoelectric transducer. When the reflected optical energy is received from a target it is mixed with the laser oscillator energy and re-transmitted. A resultant beat frequency is established between the currently received reflected energy and the energy generated within the oscillator for transmission. The beat frequency may be sampled within the transmitter-receiver circuit, providing an active system from which the range and velocity information is determined. The beat frequency is also transmitted to the target in the continuously re-transmitted beam, allowing receiving circuitry at the target to determine the target range and velocity from the transmitter.

An object of this invention is to provide a continuous wave active radar having dual function circuits for simultaneous response to both transmitted and received optical energy.

Another object of the present invention is to provide a passive optical radar system which does not require a reference or synchronous signal within the transmitted beam.

BRIEF DESCRIPTION OF THE DRAWINGS

FIG. 1 is a block diagram of a preferred embodiment of a frequency modulated-continuous wave lidar having both active and passive systems.

FIG. 2 is a schematic of the active system of FIG. 1 showing the ring laser oscillator circuit.

DESCRIPTION OF THE PREFERRED EMBODIMENT

Figure 3:
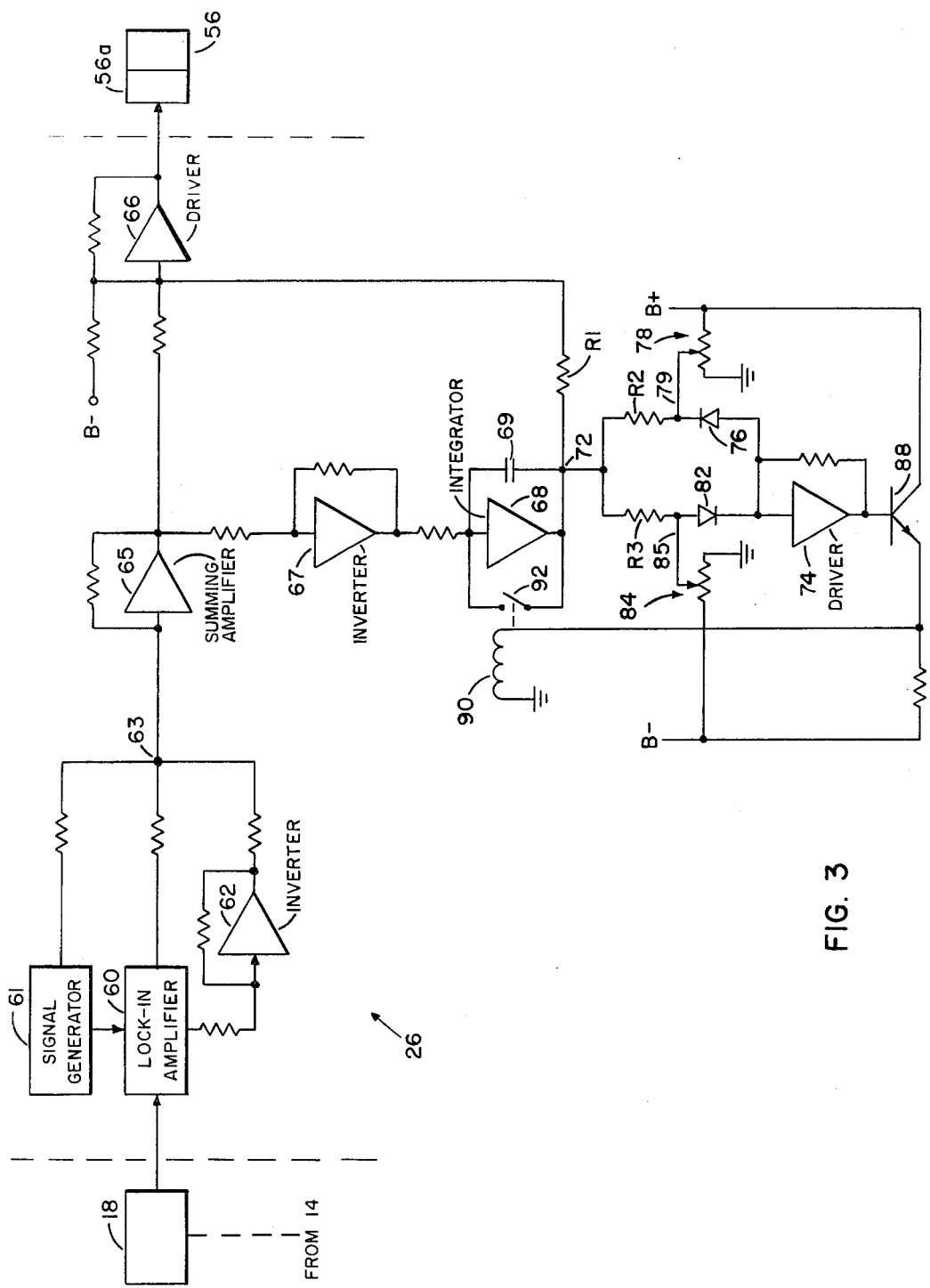
FIG. 3 is a schematic of the controller logic and mirror drive circuitry of FIG. 2.

In the drawings, wherein a preferred embodiment is disclosed, like numerals represent like parts in each figure. FIG. 1 discloses a continuous wave optical radar or lidar 10 for providing simultaneous range and velocity information. A laser oscillator 12 couples a continuous wave optical signal output to a beam splitter 14. Signal beam splitter 14 directs optical energy toward a laser power amplifier 16 and toward a detector 18. The output beam coupled through amplifier 16 is then directed through an antenna-telescope 20 toward a target 40. A reflected signal from target 40 returns along the transmit path to antenna 20. The reflected signal is coupled back through amplifier 16 and beam splitter 14 and is returned to the master oscillator 12. A portion of the transmitted signal is coupled from beam splitter 14 to detector 18. Detector 18 detects a beat frequency between the oscillator frequency and the reflected wave and feeds the beat frequency to frequency counter 22, which analyzes the detected beat frequency and generates equivalent range and velocity therefrom according to established methods. Indicator 24 indicates the target range and velocity. Detector 18 also feeds an FM drive and stability control circuit 26. Circuit 26 is coupled to oscillator 12 for controlling the precise frequency of oscillator operation. Each half FM cycle output from the oscillator has a synchronization signature, hence, no synchronization signal need be coupled from the FM drive modulator.

Target 40 may include a receiving circuit 41 having an antenna-telescope 42 for receiving a portion of the transmitted energy. Operating similarly to the receiving structure of lidar 10, optical receiver 41 has antenna 42 coupled to optical signal amplifier 44. A square law or beat frequency detector 46 responds to output signals from amplifier 44, retrieving the same beat frequency signal as detector 18. A frequency counter 48 receives the beat frequency from detector 46, generating range and velocity information which is coupled to an indicator 49.

FIG. 2 discloses additional structure of the laser oscillator 12 circuitry. Laser oscillator 12 comprises three spaced apart laser tubes 50A, 50B, and 50C forming laser assembly 50. Lasers 50B and 50C are coupled by a pair of dispersion elements such as prisms 52 for directing the optical energy substantially longitudinally therethrough. Laser 50A and 50C are coupled through prism 54 and fully reflective mirror 56. Optical energy from laser 50C reflects from mirror 56 through prism 54 and laser 50A. Mirror 56 may be adjustable by piezoelectric or other suitable mounted electronic means capable of precisely linear motion. The piezoelectric control for mirror 56 is biased by an output of drive circuit 26. Lasers 50A and 50B are coupled by beam splitter 58 and fully reflective mirror 59. Energy from laser 50B is partially reflective into laser 50A by beam splitter 58, the remaining energy being coupled through to mirror 59. Energy reflected from mirror 59 is partially coupled out of the oscillator by beam splitter 58, the remaining energy being coupled back through laser 50B and causing the ring laser to have a unidirectional output. Energy coupled out of laser 50A toward beam splitter 58 is partially reflected into laser 50B, with the remainder being coupled out of the oscillator to beam splitter 14. A fraction of the signal energy is deflected by beam splitter 14 and captured by square law detector 18. The main portion of output energy is transmitted through power amplifier 16 to the lidar output optical antenna 20. Antenna 20 follows prescribed sweep patterns through controlled elevational and azimuthal angular sweeps, directing the CW optical energy into the target zone.

The FM drive and frequency stability control circuit 26 is shown in more detail in FIG. 3, wherein the frequency lock-in logic and mirror drive circuitry are disclosed. A lock-in amplifier 60 has an input coupled to an electrical output from detector 18. A signal generator 61 has an output coupled to amplifier 60 for driving the amplifier synchronization circuitry. A dc level inverter 62 has an input coupled to receive a bias level generated in lock-in amplifier 60. Outputs from amplifier 60, generator 61 and inverter 62 are coupled together at point 63 as inputs for a summing amplifier 65. The summed output from amplifier 65 feeds two circuits, a mirror drive circuit and an automatic reset circuit, which prevents failure of the controller. The mirror drive circuit comprises driver 66 and associated biasing circuitry, an output of driver 66 being coupled to adjustable mirror 56 for linear positioning thereof. With a piezoelectric support 56a for mirror 56 the mirror can be positioned directly by the electrical output of driver 66.

For the automatic reset circuit, the output signal from amplifier 65 is coupled as an input to an inverter 67. The inverted signal is coupled as an input to an integrating amplifier 68 having a parallel integrating capacitor 69. The integrating amplifier output is coupled to a junction point 72. The input signal level supplied to driver 66 is also coupled through a resistor R1 to common point 72. Therefore, the output signal from summing amplifier 65 is present at point 72 and the time interval waveform of the inverted output from amplifier 65 is also present at point 72. Directional fluctuation of this combined signal, positive or negative error signal excursions to a predetermined limit, gates a driver 74 allowing automatic reset of the controller. The input of driver 74 is coupled in the forward direction through a diode 76 and resistor R2 to point 72. A potentiometer 78 is connected between a positive voltage source B+ and a circuit ground, the potentiometer wiper arm 79 being connected to the cathode of diode 76. The input of driver 74 is also coupled in reverse direction through a diode 82 and resistor R3 to point 72. A potentiometer 84 is connected between a negative power source B− and ground, having wiper arm 85 connected to the anode of diode 82. The output of driver 74 is coupled to the base of a transistor 88. The collector of transistor 88 is connected to B+ and the emitter is connected through a resistance to B− and through a relay coil 90 to ground. Relay 90 has a normally open contact 92 connected across capacitor 69.

In operation as an active system, laser tubes 50 and 16 operate continuous wave at a single mode single frequency. For a $CO_2$ laser, the laser frequency is dispersed by prisms 52 and 54 such that a particular rotation-vibration in the $CO_2$ system may be made to oscillate according to the particular angular positioning of the prisms. Mirrors 56 and 59 are spaced to allow a single operating mode under the peak of the gain-frequency curve, mode spacing being such that only one mode lies under the gain curve at a given time. The particular spacing between the mirrors determines the precise frequency of oscillation within a particular transistion. A triangular ramp function from signal generator 61 in FM drive circuit 26, properly biased, sweeps mirror 56 back and forth from its equilibrium position at a rate $f_m$. The precise frequency of laser oscillator 12 is constantly frequency modulated as mirror 56 moves back and forth. The transmitted signal is then directed through the transmitting telescope and scanning optics of antenna 20. A reflected signal will return along the transmission path, be preamplified in power amplifier 16 and returned to the master oscillator tubes 50. This return signal is modified in frequency by a range effect and a doppler effect. The returned signal is amplified in laser 50, mixed with the oscillator frequency and transmitted to detector 18 by beam splitter 14. Square law detector 18 reads out the difference between transmitted and received signals as a beat frequency $f_b$, with range and velocity being determined therefrom in frequency counter 22 in accordance with established prior art methods. The transmitted frequency and the return frequency are also simultaneously transmitted through amplifiers 16 and appear as the new transmitted beam.

Detector 18, controller 26 and mirror 56 also form a control loop for automatic control of the laser frequency stability. The same triangular wave drive circuits that modulate the laser beam frequency also operate simultaneously in the control loop. As shown in FIG. 3, square law detector 18 detects the beat frequency signal, processed in the conventional way to couple range and velocity into controller 26. The beat frequency includes a constant frequency signal component, $f_m$, which is the FM modulated frequency mirror drive frequency, derived from the reference triangular wave signal generator 61 for modulating the position of mirror 56. This FM drive frequency signal is fed to lock-in amplifier 60 to be synchronously demodulated with the input from generator 61. The magnitude of the output from amplifier 60 is an error signal proportional to the axial spacing error between mirrors 56 and 59 for maintaining the laser mode frequency under the exact center of the gain curve. The error signal polarity is determined by the laser output modulation frequency, depending on the amount of time that the phase angle of the error signal frequency leads or lags that of the mirror drive frequency. For example, as the optical distance between mirrors 56 and 59 change due to thermal effects, the average physical position of mirror 56 must be automatically changed in the opposite direction to compensate for these effects. The obtained error signal is proportional to the magnitude and in the direction the mirror must be moved for exact compensation.

Lock-in amplifier 60 also generates a dc bias level which is inverted by inverter 62 and summed with the error signal and triangular modulation signal at the frequency $f_m$ by amplifier 65. The summed signal is split, one part going directly to mirror drive amplifier 66 and the other going to inverter 67. As the error signal plus bias from amplifier 65 goes above the maximum or below the minimum allowed voltage range of drive amplifier 66 for driving mirror mount 56a the controller tends to fail. This failure is prevented by an automatic reset circuit which compares the voltage across integrating capacitor 69 at integrating amplifier 68 to a preset signal level at the input of driver 74 representing the maximum and minimum limits. These scale comparison voltages are produced by potentiometers 78 and 84. When an error signal reaches a limit, amplifier 74 conducts current through either of diodes 76 or 82, driving transistor 88 which provides current to close relay 90. This automatically discharges integrating capacitor 69 and reduces the input signal to driver 66. When this is done amplifier 74 no longer has a limiting drive signal, and transistor 88 and opening relay 90 are turned off, resetting the system. For the reset circuit to be stable, the operating voltage range of driver 66 must allow for more than one mode of laser oscillation to be swept across the gain versus frequency curve by mirror 56.

Simultaneous operation of several CW lidar systems at near by locations is possible without interference from adjacent systems. Several identical systems may be simultaneously operated at different vibrational-rotational frequencies, selected by dispersing prisms 52. A passive receiver may scan these vibration-rotation frequencies by using a ring laser signal amplifier having dispersive elements, thereby monitoring a plurality of lidar positions by alternately scanning the vibrational-rotational frequencies being transmitted.

Characteristics of a $10.6\mu$ lidar having a $CO_2$ laser oscillator include:

| | |
|---|---|
| Frequency, $f$ | $2.83 \times 10^{13}$ cps |
| Modulation Frequency, $f_m$ | 100 cps |
| Frequency Excursion, $\Delta f$ | 50 Mc |
| Range, R | 375 Km |
| Accuracy, $\delta R$ | ±1.5 m |
| Receiver Bandwidth, $f_R$ | 50 Mc |
| Maximum Velocity, $v_m$ | 530 m/sec |

From the given parameter of $f_m$ and $\Delta f$ the range and accuracy are determined from prior art methods of error measurement. With $N_{MAX}$ representing the maximum number of cycles of the beat frequency detectible in one period of modulation, $N_{MAX} = f_R/f_m$. Both R and $\delta R$ are determined from these known frequencies. The maximum detectible velocity, $v_m$, is controlled by the maximum detectible beat frequency, limited to $\Delta f$ and the laser frequency. Using an approximate Doppler formula for target velocities ($v$), small compared to the speed of light ($c$), the maximum detectible target velocity $v_m = \Delta f/fc$. For this system, $v_m = 530$ m/sec compares to the speed of sound in nitrogen of 330 m/sec.

A limitation which is common to all FM-CW radars may be seen in the interaction of range and velocity signals when the range and velocity produced frequency shifts are similar. For an increasing frequency excursion, the returned beat frequency is the sum of the velocity and range component frequency shifts. For a decreasing frequency excursion the beat frequency signal becomes the difference between each frequency shift component. The algebra of subtracting frequencies to produce beat frequencies does not allow negative numbers as resultants. It is therefore difficult to precisely separate the magnitudes of range and velocity only when their contributions to the beat signal are almost identical.

This Lidar system provides range and velocity for both active and passive systems of CW operation. The system is useful in air traffic control around airports and aircraft carriers. Since it is a CW system, it may be built into existing automatic control circuits requiring precise continuous data. Other obvious applications include surveying, target rangefinding, precise location of troops in combat by close-support-activities, and missile guidance systems.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

We claim:

1. A continuous wave optical radar system for measuring range and velocity of a target, comprising: an optical transmitter-receiver having a laser oscillator for generating a precise narrow bandwidth wave, an optical antenna for simultaneously transmitting said narrow wave toward a target and receiving a reflected wave from said target, a beam splitter for simultaneously coupling the reflected waves into the laser oscillator and the output optical waves from the laser oscillator and for continuously sampling the output wave, a square law detector coupled to receive optical energy from said beam splitter for determining beat frequencies between the laser oscillator frequency and the received reflected wave, a controller circuit for modulating said laser oscillator to provide a frequency modulated output signal and for adjusting the cavity of said laser oscillator in response to an output signal from said detector for variably controlling the laser oscillator output frequency, a frequency counter and indicator circuit for measuring the beat frequency and indicating the proportional range and velocity therefrom, and said controller circuit including a frequency modulation driver circuit for sinusoidal length modulation of the laser oscillator cavity and an overdrive stability circuit for preventing overdrive failure of the controller circuit and the laser oscillator cavity.

2. An optical radar system as set forth in claim 1 wherein said laser oscillator comprises first, second and third laser tubes, an output beam splitter coaxially aligned with a first end of said first and second tubes for passing and reflecting a predetermined amount of laser energy inpinging thereon, a fully reflective mirror adjacent said output beam splitter and coaxial with said second tube for directing energy impinging thereon back through said beam splitter and said second tube, a first prism adjacent a second end of said first tube, an adjustable mirror adjacent said prism and substantially coaxial with a first end of said third laser tube for directing energy from said third laser through said first prism and into said first laser tube, and second and third prisms respectfully aligned coaxially with the second ends of said second and third laser tubes for coupling laser energy therethrough.

3. An optical radar system as set forth in claim 2 wherein said controller frequency modulation drive circuit comprises a frequency modulation signal generator, a lock-in amplifier having an input coupled to the output of said square law detector and an output connected to the output of said signal generator, an inverter having an output coupled to the signal generator output, a direct current bias output of said lock-in amplifier coupled as an input to said inverter, mirror drive amplifier having an output coupled to said adjustable mirror for adjusting the optical distance between mirrors of said laser oscillator, and a summing amplifier having an input coupled to the signal generator output and an output coupled to an input of said mirror drive amplifier.

4. An optical radar system as set forth in claim 3 wherein said controller overdrive stability circuit comprises an integrating amplifier circuit, an inverter having an input coupled to said summing amplifier for sampling and inverting the mirror drive input signal and an output connected to the input of said integrating amplifier circuit, an output of said integrating amplifier circuit being resistance coupled to the input of said mirror driver for combining the mirror drive input signal and the inverted mirror driver input signal, a switching relay having a contact connected across said integrating amplifier circuit for gated discharge thereof, a driver amplifier having an input and an output, first and second diode coupling circuits connected in parallel between said integrating amplifier circuit output and said driver amplifier input, and a semiconductor gate circuit connected between the output of said driver amplifier and said switching relay for gating the relay in response to predetermined outputs from said driver amplifier.

5. An optical radar system as set forth in claim 4 wherein said first diode coupling circuit comprises a series connected resistor and diode connected in the forward direction between the output of said integrating amplifier and the input of said driver amplifier and a potentiometer connected to the anode of said diode for coupling a biasing potential thereto, said second diode coupling circuit comprises a series connected resistor and diode connected in the forward direction between the input of said driver amplifier and the output of said integrating amplifier circuit and a potentiometer connected to the cathode of said second diode for coupling a biasing potential thereto.

6. An optical radar system as set forth in claim 5 wherein said semiconductor gate circuit is a transistor having the base thereof connected to the output of said driver amplifier.

7. An optical radar system as set forth in claim 2 and further comprising a laser power amplifier between said directing beam splitter and said antenna-telescope for amplifying said transmitted and received optical waves, and wherein said lasers are carbon dioxide lasers.

8. An optical radar system as set forth in claim 7 and further comprising a remote optical receiver for receiving energy from said optical transmitter and measuring range and velocity of a target therefrom, said remote optical receiver comprising a receiving antenna, a square law detector for detecting the beat frequency in said optical energy, an optical signal amplifier having an input coupled to an output of said receiver and an output coupled as an input to said detector, and a frequency counting and indicator circuit responsive to an output of said detector for reducing and indicating the proportional target range and velocity from said beat frequency.

* * * * *